Feb. 5, 1952   H. E. KRUGER   2,584,885
PANEL FOR BOX TYPE VEHICLE BODIES
Filed March 27, 1947
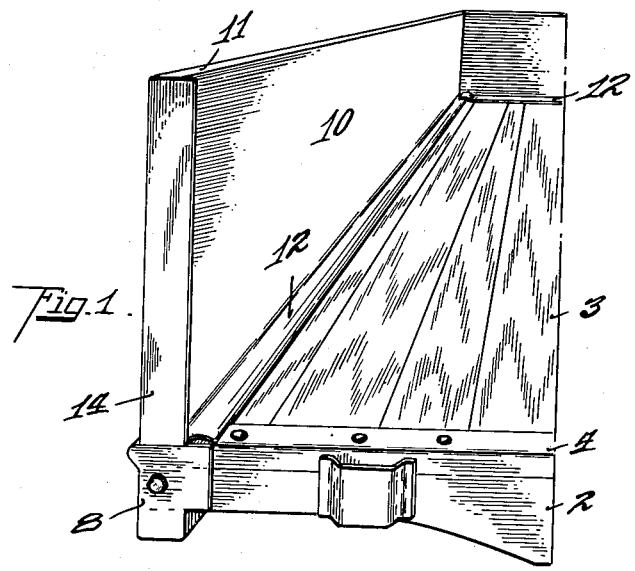
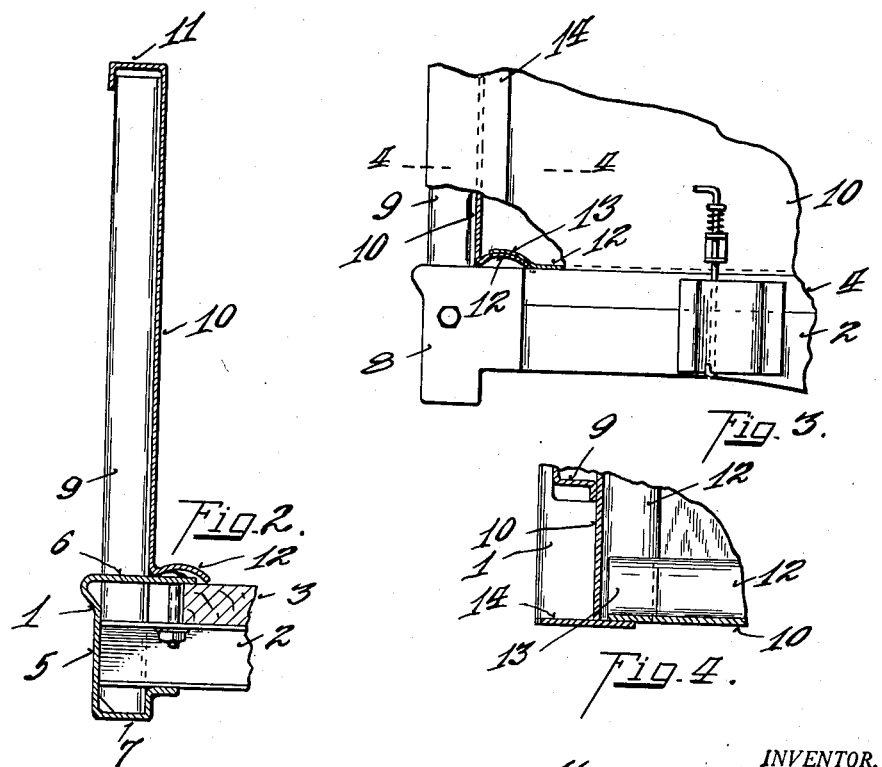
INVENTOR.
Henry E. Kruger
BY Oliver B. Kaiser
Atty.

Patented Feb. 5, 1952

2,584,885

UNITED STATES PATENT OFFICE 2,584,885

PANEL FOR BOX TYPE VEHICLE BODIES

Henry E. Kruger, Galion, Ohio, assignor to The Perfection Steel Body Company, Galion, Ohio, a corporation of Ohio Application March 27, 1947, Serial No. 737,551

1 Claim. (Cl. 296—28)

This invention relates to improvements in the structure of the panels forming the opposite side and end walls of a box type of cargo carrying vehicle body, removably mounted upon a flat bed or platform for body convertibility, from one type to that of another.

An object of the invention is to provide a box type of body for a cargo carrying vehicle of simple, durable and low cost construction, with the walls of the box each as a panel of sheet metal having its upper longitudinal end bent to rim the same and a lateral flange coextensive with the lower longitudinal end to extend inward of the box, the flange of arc shape in cross section to stabilize both the panel and the flange.

Another object is to provide a box type vehicle body with the walls of the box each constituting a sheet metal panel having stakes fixed thereon and laterally thereof for removably installing and sustaining the panel in an erect position upon the platform of the body, the lower longitudinal end of the panel laterally flanged to extend inward of the body, the flange of curved form in cross section with its free end leading downwardly to impingingly bear upon the platform when the panel is installed upon and anchored to the platform.

Various other features and advantages of the invention will be more fully set forth and apparent from the following description of a preferred embodiment as illustrated by the drawings accompanying and forming a part of this specification, in which:

Figure 1 is a perspective view of a section of the improved vehicle cargo carrying box type of body.

Figure 2 is an enlarged vertical section through a side panel thereof.

Figure 3 is an elevation of a portion of one or rear end of the body, partly in section.

Figure 4 is a section on line 4, 4, Figure 3.

The present invention is directed specifically to the siding or panels for forming a box type of vehicle body, the panels removably mounted upon a platform as a base of bottom of the body, to render the body convertible from a receptacle type to a flat or other type. The platform may be of conventional construction and as its structure forms no part of the present invention, complete illustration and detail description thereof is herein omitted except as may be pertinent to fully and clearly exemplify the application of the siding or panels to convert the body to a receptacle type.

Referring to the drawings the platform, preferably, is composed of a pair of side rails, one respectively for each of the opposite longitudinal sides of the platform. The side rails 1 are of duplicate construction and each rail is of cross-sectional shape for interengagingly receiving a relative end of each of a plurality of determinately spaced bolsters 2, extending cross-wise of the platform and permanently fixed to the side rails. The bolsters, preferably are of channel form in cross-section and support the flooring of the platform, which following the general practice consists of wood boards or planks 3, adjoiningly arranged longitudinally of the platform and fixed to the bolsters.

The bolsters, for each of the opposite ends of the platform, each has its web portion outward in registry with the relative ends of the side rails and its outer plane surface flush with a relative end of the flooring which is capped by an angle bar or rail 4, welded or otherwise fixed to the top side of the bolster upon which it is superposed.

The side rails, preferably are of cross-sectional shape of channel form, each having a web portion 5 and a pair of opposite flanges 6 and 7 integrally joining with the web. The web provides an outer facing or edge for the platform with the flange 6 extending at right angles therefrom in plane with the top or upper side of the platform. The web at its juncture with the flange 6 is rolled to provide an outwardly extending corrugation or ridge reinforcing and increasing the rigidity of the rail and serves as a rub rail.

Each of the opposite ends of the rail, respectively, is capped by a plate 8, welded thereto and overlying the relative outer side of an end bolster.

The flange 7 for the bottom side of the rail is of off-set form in cross section, the off-set extending inwardly of the channel of the rail, providing a sill or ledge longitudinally of the rail, for supporting an end of each of the bolsters 2. The off-setting of the flange 7 provides a shoulder in parallelism with the web and channels the flange longitudinally for the full length of the rail for socketing and laterally confining the end of each stake 9, as employed for supporting a side panel, projecting into the rail through a slot or opening in the top flange 6 of the rail.

The panels 10 for the box type of body, as opposite side and end panels, are formed of sheet metal, each removably mounted and perpendicularly sustained by the stakes 9 of the necessary number required for each panel, which respectively are fixed to the outer face side of the panel as a permanent part thereof.

The side panels are of duplicate construction. Each longitudinally of its upper end is bent at right angles to extend laterally from one side thereof and then flanging downward to provide a rim 11, extending outward, which however for the rear end panel of the box extends inward to accommodate for a sliding door, as a closure for a discharge opening with which the rear panel is usually equipped.

The lower end of each of the panels longitudinally is bent at right angles to provide a flange 12 to extend inwardly of the box of the body for the length of the panel and is of arc or curved form in cross-section with its outer end directed downwardly to be compressively engaged upon the portion of the flooring of the platform which it overlies.

The curved cross-sectional form of the flange 12 adds stability thereto lengthwise thereof and has a reach slightly beyond the end of the flange 6, of the side rail of the platform which it overlies, or the capping rail 4 covering an end of the flooring boards for contact with the flooring boards. As the outer free end of the flange 12 extends slightly below the line of the bend at the juncture with the body of the panel it is brought into compressive contact upon the flooring in anchoring the panel to the platform, as by bolts mounted upon the outer side of the panel which for the side panels have a coupling connection with the side rails of the platform and for the end panels with stake brackets on the outer side of the end bolsters. The type of side rails as disclosed provide for socketing the stakes therein by engagement through an aperture in the upper flange 6, the anchoring bolts traversing the side rail at a stake aperture of which an excess number is provided. As various methods are employed for anchoring the panels to the platform specific disclosure need not be made herein, it being also obvious that the same result can be accomplished with some types of stake locks.

The opposite ends 13 of the flange 12 for each of the end panels are curved longitudinally to overlap a relative end of the base flange of the side panels.

It is desirable to clamp the end boards of the flooring along their longitudinal margins engaged beneath the flange 6 of the side rails by bolts traversing the flange and the top flanges of the bolsters, as illustrated in Figure 2, with the bolt heads exposed to the upper side of the platform. The radius of the flange 12 of the side panel therefore is such as to afford clearance for the bolt heads without interference to the free end of the base flange of the panel to be compressively engaged with the flooring board which it overlies. This eliminates any indenting or aperturing of the flange, nor is it necessary that the spacing of the bolsters be at precision measurement apart.

The side and end panels can be readily installed upon or removed from the platform for converting the body from a flat platform or bed type and vice versa. In the assembly of the panels upon the platform the side panels are first installed, whereupon the end panels are inserted in place and generally locked to the side panels at their rims. The side panels at each of their ends are protected by a plate 14 for the heighth of the panel, preferably welded thereto and which extends slightly beyond the inner side thereof to provide an overlapping abutment for a relative end of an end panel to confine the same against outward movement.

Having described my invention, I claim:

A box type of body for a cargo carrying vehicle, comprising a platform, sheet metal panels sustained and anchored, one respectively on each of the opposite sides and forward end margins of the platform to provide the walls for a box type of vehicle body, each panel having its lower longitudinal end laterally flanged, the flange extending inwardly of the box and bearing upon the platform, of arc form in cross-section to channel the underside for its full width with the free end thereof leading downwardly beyond the plane of the junction of the flange with the body of the panel to impingingly bear upon the platform when the panel is installed and anchored to the platform, the channel defining a space between its terminals at its opposite longitudinal sides which bear upon the platform for the reception of securing means protruding from the upper surface of the platform in a row linear of the channel.

HENRY E. KRUGER.

REFERENCES CITED

The following references are of record in the file of this patent:

UNITED STATES PATENTS

| Number | Name | Date |
|---|---|---|
| D. 144,900 | Boepple | June 4, 1946 |
| 408,611 | Garrett | Aug. 6, 1889 |
| 691,330 | Watson | Jan. 14, 1902 |
| 846,787 | Foster | Mar. 12, 1907 |
| 1,223,912 | Waterman | Apr. 24, 1917 |
| 1,425,596 | Kramer | Aug. 15, 1922 |
| 1,558,424 | Wright | Oct. 20, 1925 |
| 2,447,471 | Wagner | Aug. 17, 1948 |

FOREIGN PATENTS

| Number | Country | Date |
|---|---|---|
| 146,276 | Great Britain | Jan. 6, 1921 |